United States Patent [19]

Matuszak

[11] Patent Number: 4,599,131

[45] Date of Patent: Jul. 8, 1986

[54] DELABELER FOR PLASTIC CONTAINERS

[75] Inventor: John J. Matuszak, Rossford, Ohio

[73] Assignee: Owens-Illinois, Inc., Toledo, Ohio

[21] Appl. No.: 742,687

[22] Filed: Jun. 10, 1985

[51] Int. Cl.⁴ .............................................. B32B 31/22
[52] U.S. Cl. .......................................... 156/584; 15/60;
 51/328; 156/154; 156/155; 156/344; 264/37
[58] Field of Search .................. 15/60, 302; 29/426.3,
 29/426.4, 426.5; 51/328; 156/154, 155, 344,
 584; 264/37, 139, 162

[56] References Cited

U.S. PATENT DOCUMENTS

2,573,169 10/1951 Gerlach et al. ..................... 15/60 X
3,534,428 10/1970 Pugh et al. ............................. 15/302
4,033,804 7/1977 Baldyga ......................... 156/153 X
4,325,775 4/1982 Moeller ............................... 156/584

Primary Examiner—Robert A. Dawson
Attorney, Agent, or Firm—Philip M. Rice

[57] ABSTRACT

A plastic bottle delabeling apparatus in which a series of heated rolls that are driven at increasingly greater peripheral velocity engage the plastic bottles to flatten and stretch the bottles. While flattening the bottles, the apparatus heats the plastic bottle surface by the contact with the heated rolls, effectively softening the bond of any label to the bottle. The flattened bottle is then passed through a pair of opposed rotating brush rolls which strip the loosened label from the bottle. The rolls are in vertically opposed sets with the peripheral velocity of the sets of rolls being successively greater in the direction of movement of the bottles therebetween.

10 Claims, 8 Drawing Figures

DELABELER FOR PLASTIC CONTAINERS

BACKGROUND OF THE INVENTION

In recent years it has become the practice to blow mold plastic containers, particularly those of the high density polymer type for packaging many liquids, including soft drinks. In the process of forming the containers, the application of labels to these containers may take place. By applying the labels in the plants where the container is made, the shipment of the container with a label, in particular paper labels or in some instances plastic labels that are adhered to the container by heat sensitive glues, can be made. In the production of such containers, there is always the possibility that the production machinery will malfunction, producing containers that are not acceptable. In particular, where the containers are labeled as part of the container forming process, such as by "in-mold" labeling, or separate labeling after forming the container, there can be problems involving the production of containers with improperly positioned or improperly applied paper or plastic labels. In those cases, the expense of removing labels and then relabeling in some instances has become so labor intensive that it would be more advantageous to be able to remove the badly labeled containers from the production line and then recycle the plastic containers. Recycling involves grinding the plastic containers into a size suitable for remelting and into forming new bottles.

In the reclaiming of defectively labeled bottles, in view of the fact that the bottles are generally labeled with paper labels, it is important that the paper be removed before the plastic is recycled. This has been done in the past by separation systems which will separate paper that has been ground up or pulverized from the more dense plastic materials. This of course also adds to the cost of the reclaiming of the plastic. When the reclaiming is to take place in the bottle forming plant where the plastics are clean, with the exception of the paper label, it is advantageous to have a system for removing the paper labels without requiring expensive separation systems that are presently used, both in reclaiming new, labeled bottles, as well as in the reclaiming of used or returned labeled containers.

SUMMARY OF THE INVENTION

The present invention provides an apparatus which will remove extraneous, adhered material from plastic containers for recycling of the plastic, in which two series of horizontal rolls positioned in opposition to each other form a converging spacing between the rolls so that upon introduction of a bottle into the gap between the rolls the bottle will be squeezed as it moves from a widely spaced-apart set of rolls through more narrowly spaced-apart sets of the rolls. The rolls are being driven at progressively greater peripheral velocities and are being heated so as to soften the plastic of the bottle and at the same time soften the glue of the label. The flattened, heated and stretched bottle is progressively pulled through a set of rotating wire brushes which effectively remove the paper labels from the flattened plastic bottles.

It is an object of the present invention to provide a system for removing paper or other extraneous materials from clean plastic bottles to be recycled without requiring the complicated separation systems presently used.

It is a further object of this invention to provide a system for flattening and stretching, as well as heating, plastic containers so that the heat activated glues used to adhere labels will become softened and the paper of the labels will be easily separated from the plastic bottles.

DETAILED DESCRIPTION OF THE DRAWINGS

As previously set forth in the summary of the invention, the present apparatus is for the purpose of flattening plastic containers and removing labels therefrom for the purpose of recycling the plastic without having paper or non-compatible plastic labels contaminating the polymer which is used to make the plastic bottle.

In particular, in the manufacture of plastic containers where the labels are applied to the containers in the manufacturing plant rather than at a user's or filler's plant, it is desirable, when something may go wrong with the process, either in the manufacturing of the bottle or of applying the labels, that the labels which have been applied to containers that are defective be removed easily and quickly so that the bottles may be recycled.

Figure 1:
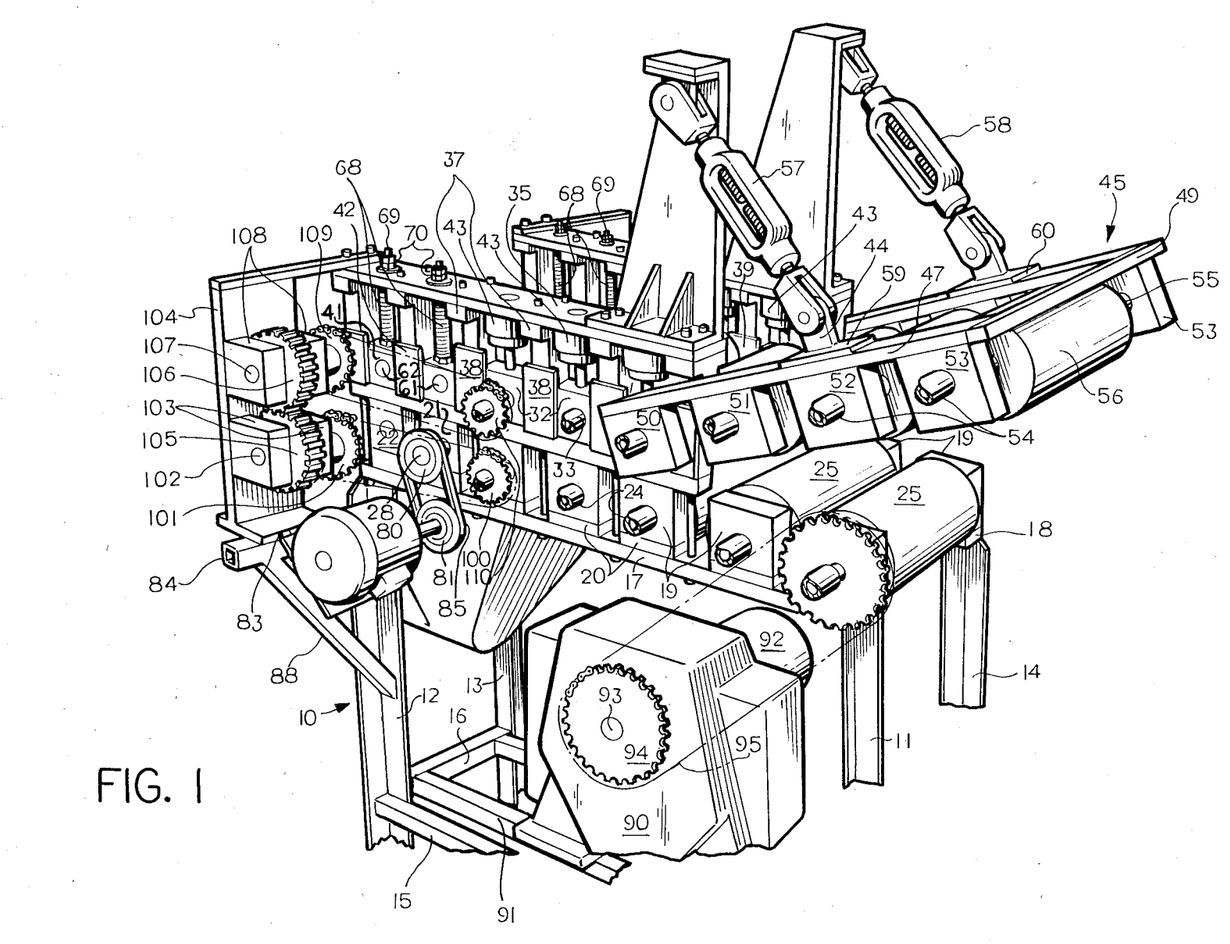
FIG. 1 is a perspective view of the delabeler apparatus of the invention.
Figure 2:
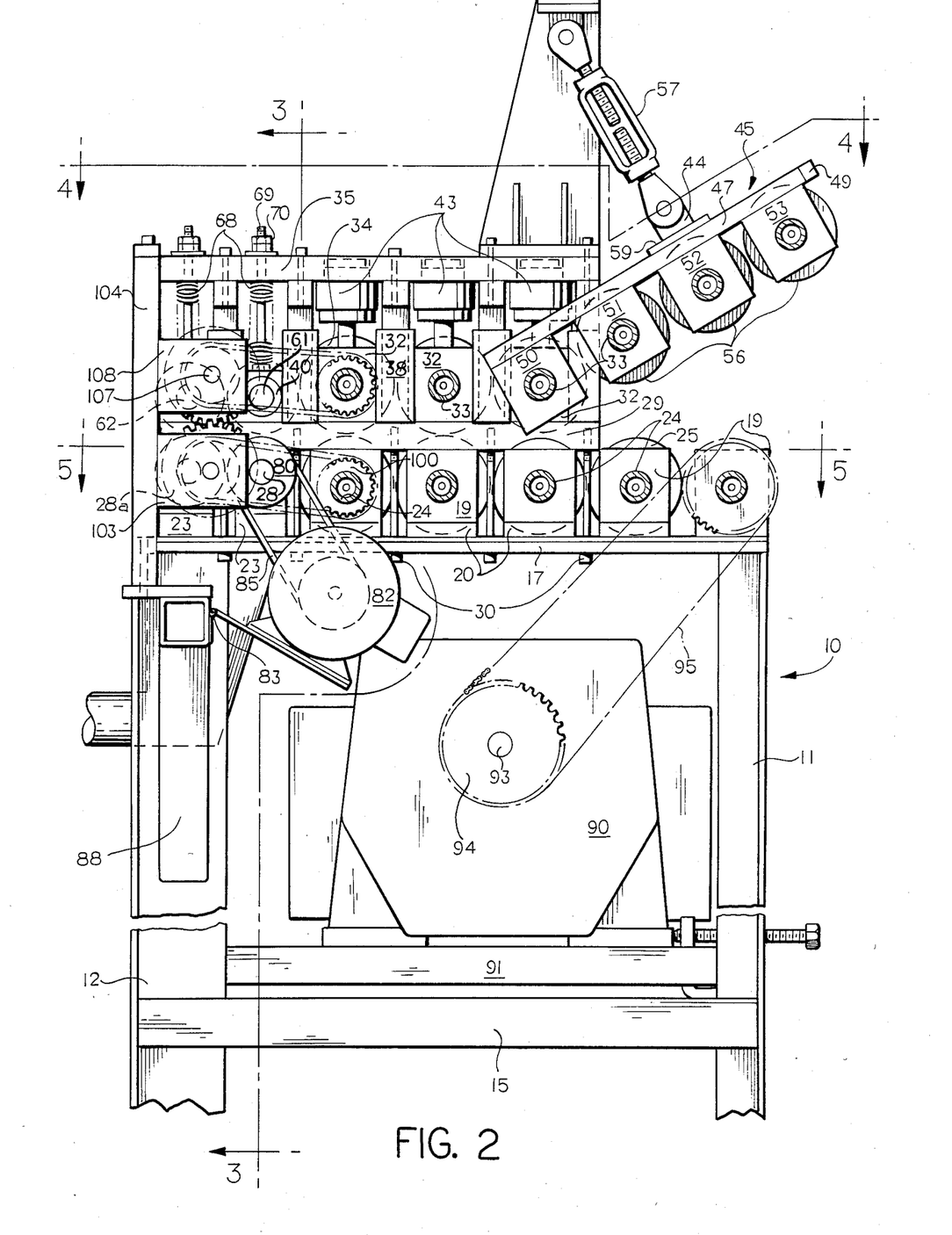
FIG. 2 is a side elevational view of the delabeler of FIG. 1.
Figure 3:
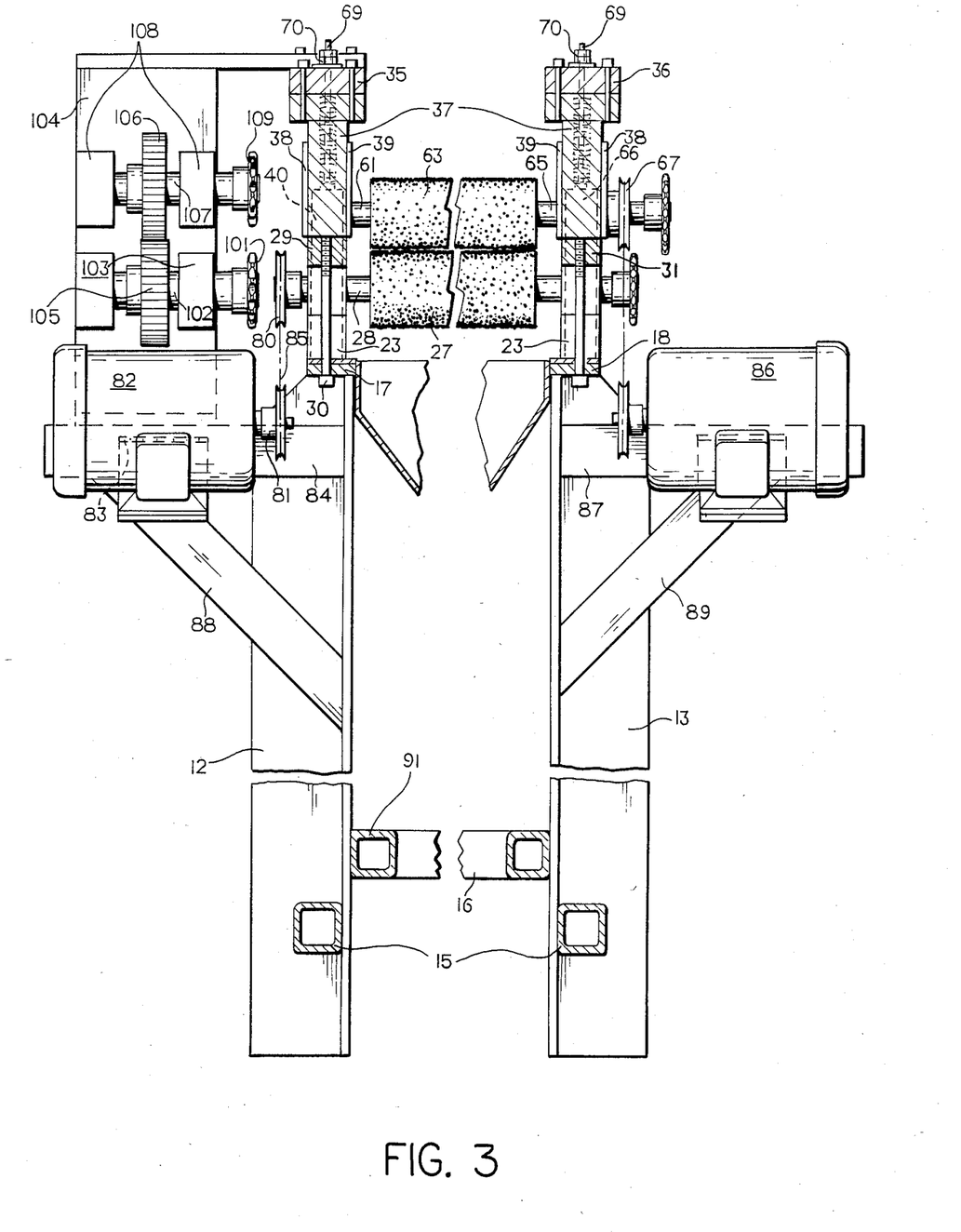
FIG. 3 is a vertical, sectional view taken at line 3—3 of FIG. 2.

With particular reference to FIGS. 1-3, a general description of the apparatus will be given. A benchlike frame 10 comprises four vertical legs 11-14. The portions of the legs 11-14 above the level of the floor on which the bench rests are connected together by horizontal rectangular bracing members 15 and 16. The members 15 extend between the legs 12 and 11 and the legs 13 and 14 which are the long side of the frame of the bench 10, while members 16 connect across the width between the legs 12 and 13 and similarly between legs 11 and 14, although not shown specifically in any of the views. The upper ends of the legs 11 and 12 are spanned by a horizontal elongated support member or bar 17. The bar 17 is generally parallel to the horizontal brace 15. A second horizontal bar 18 extends between the upper end of the other legs 13 and 14. It should be noted that the legs 11-14 are formed of angle iron and that the horizontal bars 17 and 18 may be welded to the upper ends of these legs and constitute parallel horizontal members on which a series of bearing blocks 19 are mounted to the upper surface thereof as best shown in FIGS. 1-3. Each of the bearing blocks 19, of which there are five of the same size on each side of the machine, are mounted to the horizontal bar 17 by bolts (not shown). Each of the blocks is mounted to the horizontal bar with an intervening shim 20. In addition to the five bearing blocks 19, which have the same external configuration, on the left end of the upper surface of the horizontal bar 17 are mounted a pair of smaller bearing blocks 21 and 22. These bearing blocks 21 and 22 are also bolted to the member 17 by bolts extending vertically upward through the member 17 and through intervening shims 23 into the blocks themselves. Since the blocks 21 and 22 are somewhat smaller than the blocks 19, the shims 23 are generally thicker so as to accommodate the smaller blocks.

Figure 5:
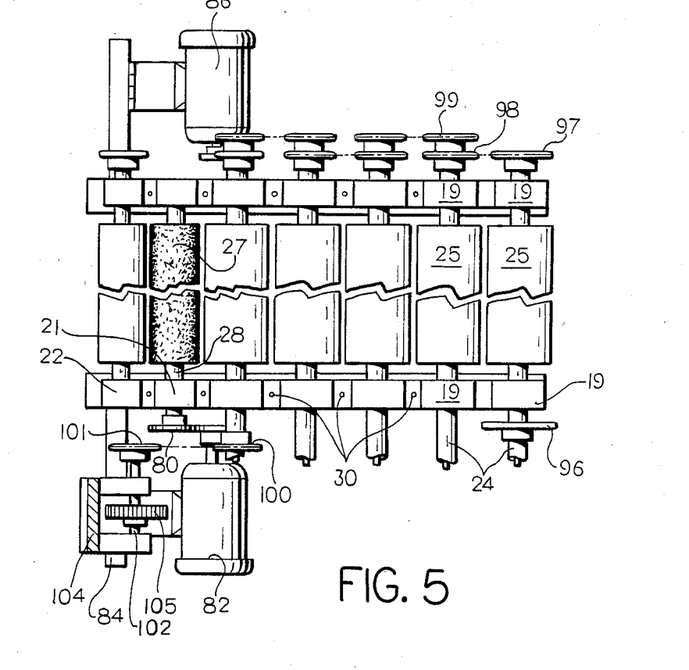
FIG. 5 is a sectional view on a reduced scale showing the lower roll assembly taken at line 5—5 of FIG. 1.

It should be pointed out that the blocks 19 each support one end of a hollow shaft 24. Each of the shafts 24 serves as a supporting member for one end of a hollow roll 25. The horizontal supporting bar 18 shown to the right in FIG. 3 likewise supports a series of bearing blocks 19, 21 and 22 essentially identical to those previously described with respect to the left side of the machine as viewed from the right in FIGS. 1 and 2. The other ends of the rolls 25 are supported by horizontal shafts 26. The shafts 26, on the right side of the machine, as viewed from the right in FIGS. 1 and 2, are of different lengths, depending upon whether they are provided with a single drive sprocket or a pair of drive sprockets, as will be explained in greater detail later. The bearing blocks 21, as best seen in FIG. 3, support a horizontal roll brush 27 mounted on a horizontal supporting shaft 28. The pair of oppositely positioned small bearing blocks 22, which are at the extreme left in FIGS. 2 and 5, support a nip roll or roll 28, whose diameter is somewhat less than the diameter of the hollow rolls 25.

It should be understood, however, and as can be readily seen when viewing FIG. 2, the upper surface of the rolls 25 define a horizontal plane which also defines the upper surface of the roll brush and the nip rolls. Overlying the two bearing blocks 21 and 22 and the next adjacent three bearing blocks 19 is a horizontal elongated member 29. The member 29 is bolted to the horizontal bar 17 by a series of bolts 30, as best seen in FIGS. 2 and 3. A similar horizontal elongated member 31 is bolted to the horizontal bar 18 by bolts similar to the bolts 30. In this fashion the bearing blocks 19, 21 and 22 are fixed in position. Additionally, the upper surface of the members 29 and 31 serve as locating surfaces for a series of bearing blocks 32. The bearing blocks 32, of which there are three on each side of the machine, are mounted relative to the member 29 for limited vertical movement relative thereto. The bearing blocks 32 serve to support the horizontal shafts 33 of a series of upper, hollow rolls 34. The bearing blocks 32, however, are not bolted to the horizontal member 29 as are the bearing blocks 19 which bolt to the bars 17 and 18. Overlying the bearing blocks 32, on either side of the machine, are a pair of upper frame members 35 and 36, as perhaps can best be seen in FIGS. 1–3. A series of vertical pedestals 37 extend between the frame member 35 and the horizontal, intermediate member 29. The vertical pedestals 37 are generally T-shaped with the top of the T bolted to the underside of the upper frame member 35 and 36. The pedestals 37 are of a width that they separate and guide adjacent bearing blocks 32 which may slide relative thereto. The bearing blocks 32 are prevented from moving laterally by the fact that the pedestals 37 carry plates 38 and 39 that have a width somewhat greater than the width of the pedestal so that the edges thereof extend over and confine the bearing blocks 32 to vertical motion in the space above the horizontal members 29 and 31. In addition to the bearing blocks 32, there are a pair of smaller bearing blocks 40 and 41. The bearing blocks 40 and 41 are retained by plates 42 which are somewhat shorter than plates 38 and 39, but are essentially of the same width so that when they are applied to the pedestals 37, their lateral edges overlie the edges of the blocks 40 and 41.

Figure 4:
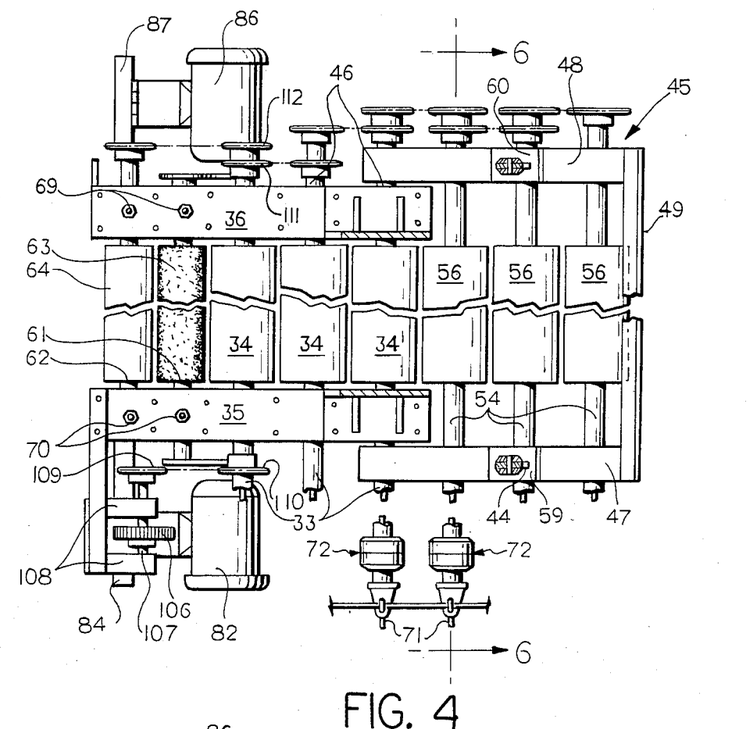
FIG. 4 is a sectional view on a reduced scale showing the upper roll assembly taken at line 4—4 of FIG. 2.

Each of the rolls 34 is biased in a downward direction by a pair of standard stud model FS-1 hydraulic cylinders manufactured by Ford Industries, Inc. These hydraulic cylinders are designated by reference numeral 43 in FIGS. 1 and 2. Each of the cylinders 43 has a downwardly extending actuator rod 44 engaging the upper surface of a respective bearing block 32. It should be noted that there are three of these cylinders 43 on each side of the machine with the upper ends of the cylinders being fitted within recesses formed in the upper frame member 35 on the left hand side and the upper frame member 36 on the right hand side, as viewed from the right in FIGS. 1 and 2. While these cylinders 43 are described as being hydraulic cylinders, they could as well be formed as large spring members, it being understood that their function is to bias the rolls 34 in a downward direction with a predetermined amount of force. The shaft 33 that supports the roll 34, which is the farthest to the right as seen in FIG. 2 and also as seen in FIGS. 1, 2 and 4, extends outwardly on the left hand side and serves as the pivot for one end of a generally U-shaped frame 45. The rolls 34 also have shafts 46 which extend outwardly to the right concentric with the shafts 33 and extend through bearing blocks provided on the right hand side of the machine, as viewed in FIGS. 1 and 2 and as shown in the plan view of FIG. 4. As best seen in FIG. 4, the frame 45 is a generally U-shaped frame having two parallel sides 47 and 48 joined at one end by a connecting bar 49. Both of the sides 47 and 48 carry four downwardly extending shaft bearing blocks 50, 51, 52 and 53. The bearing block 50 is supported by the shaft 33 of the most right hand roll 34. The opposite end of the roll 34 has its shaft 46 extending outwardly and it also forms the pivot for the side 48 of the frame 45. Each of the pairs of bearing blocks 51, 52, and 53 supports shafts 54 at the left side and the shafts 55 at the right side. Each pair of concentric shafts 54 and 55 carries and supports a hollow roll 56 therebetween for rotation about the axes of the shafts.

Perhaps it should be explained that each of the rolls 34, when in its most downward position as shown in the drawings of FIGS. 1 and 2 with their bearing blocks held down in contact with the member 29, will be spaced from and directly above a lower roll 25 by about a ⅛ of an inch gap. As can perhaps best be seen in FIG. 2, two of the rolls 56, which are mounted to the frame 45, are above the first two rolls 25 of the lower set of rolls. While two of the rolls 56 are generally vertically above and parallel to two rolls 25, the third roll 56 is supported outwardly beyond the rolls 25 and its function will be explained in greater detail later in connection with FIGS. 7 and 8.

The frame 45 is held at an angled position relative to the plane of the top of the rolls 25 by a pair of adjustable turnbuckles 57 and 58. One end of the turnbuckle 57 is pivotally connected to a plate 59 carried by side 47 of the frame 45. The other turnbuckle 58 is similarly pivotally connected to a plate 60 carried on the side 48 of the frame 45. As can readily be seen, the frame 45 may be raised or lowered by adjustment of the turnbuckles 57 and 58. In addition, the first roll 34, of the upper series of rolls that is spaced from the lower rolls 19, may be moved up and down by an object entering the space between the roll 34 and the lower fixed roll 19. The smaller bearing blocks 40 and 41, shown to the left in FIGS. 1 and 2, support shafts 61 and 62, respectively. The shafts 61 and 62 rotatably support one end of a brush roll 63 and a nip roll 64, respectively. The end of the roll 63, opposite the shaft 61, carries a drive shaft 65 which extends through a bearing block 66 and supports a drive pulley 67 at the outer end thereof. Both of the bearing blocks 40 and 66, which support the shafts of the brush roll 63 and the bearing blocks which support the nip roll 64, are held downwardly by a series of Belleville springs 68. The Belleville springs 68 are maintained in the vertical orientation shown by vertical bolts 69. The upper ends of these bolts 69 are threaded and carry nuts 70. The lower or head end of the bolts 69 bear against their respective bearing block 40, 41, 66 or the bearing block which supports the right hand end of the nip roll 64.

As can be seen, the Belleville springs bear against the upper surface of their respective bolts and against the under surface of the frame members 35 and 36. It should be understood that when either the brush rolls or the nip rolls are forced apart by passage therebetween of the containers being flattened and stripped, the Belleville springs will resist the relative movement of the opposed brush rolls and nip rolls with a force, depending upon the number of springs and the sizes of the Belleville springs used. The shafts or bolts 69 are free to move vertically through openings in the frames 35 and 36. The lower end of the rods 69 in effect are bolt heads which bear against the upper surface of the respective bearing blocks 40, 41 and 66.

Figure 6:
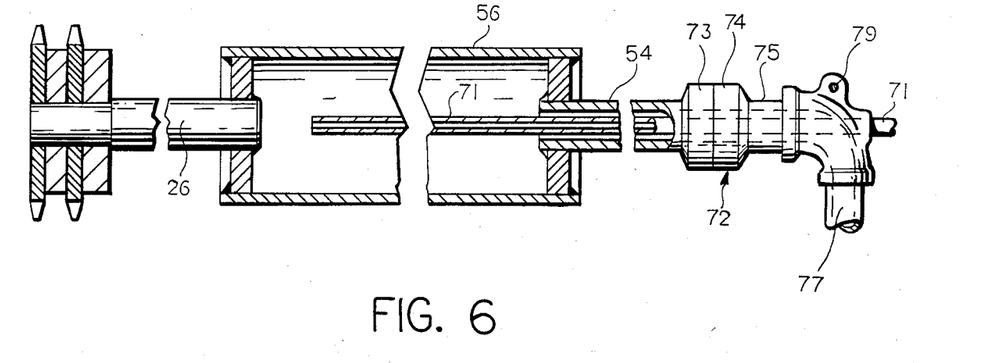
FIG. 6 is an enlarged sectional view taken through a roll at line 6—6 of FIG. 4.

The roll supporting shafts 54 and 33 and 24, as previously explained, are hollow shafts. With particular reference to FIG. 6 which shows in detail one of the rolls, its supporting hollow shaft 24 surrounds a concentric tube 71 which extends through the interior shaft 24. The outer end of the shaft 24 is coupled to a rotary watertight unit 72. The coupling unit 72 is only schematically shown and may be a rotary pressure joint made by the Dublin Company of Northbrook, Ill. The unit 72 is shown split into two members 73 and 74, the member 73 being fixed to the shaft 24 and rotatable therewith, while the member 74 is stationary and is coupled to a pipe 75 which in turn is coupled to a 90° elbow 76. The elbow 76 is formed with a straight-through opening also, through which the tube 71 may extend. The elbow 76 has an outlet tube 77 coupled thereto through which heated fluid which is introduced to the interior of the roll 25 through the tube 71 may be drained. It is intended that heated fluid such as steam, hot air or heated oil will be introduced to the interior of the rolls 25, 56 and 34 in the same manner and with the same connections as is illustrated in FIG. 6.

A supply manifold and exhaust manifold will extend along the left side of the apparatus, as shown in FIG. 1, so that heated fluid may be circulated through all of the rolls that have hollow shafts coupled thereto. In FIG. 4 there is shown a pair of rotary coupling units 72 coupled to the shafts 33 and 54. The elbows 76 of these coupling units are prevented from rotating by reason of their having a horizontal, anti-torque rod 78 extending through an eyelet 79. All of the coupling units are common to the upper rolls as well, and a similar arrangement is provided for the coupling units that are used in connection with the lower rolls.

The brush rolls 27 and 63 are driven independently of each other and of any other drive system provided for the other rolls. For example, the brush roll 27 and its shaft 28 has a pulley 80 coupled thereto. The pulley 80 is belt driven from a pulley 81 which is coupled to the output shaft of a motor 82. The motor 82 is shown as having its base pivotally connected by a hinge 83 to a stationary frame member 84. A drive belt 85, which extends between the pulleys 80 and 81, is maintained under tension by the weight of the motor 82 which pivotally is supported by the hinge 83. In a similar manner, the upper brush roll 63 has its drive pulley 67 driven by a motor 86. The motor 86 is pivotally mounted, in a manner similar to that of motor 82, to a horizontal frame member 87. Both of the frame members 84 and 87, which respectively extend to the left and to the right as shown in FIG. 3, are welded to the legs 12 and 13, respectively, and are braced by angle braces 88 and 89. Thus, it can be seen that both brush rolls 27 and 63 are independently driven by separate motors and, generally speaking, will be driven in opposite directions at relatively high speeds, the purpose for which will be later explained, however, it being generally considered that these brush rolls are for removing labels from the flattened plastic containers.

Figure 8:
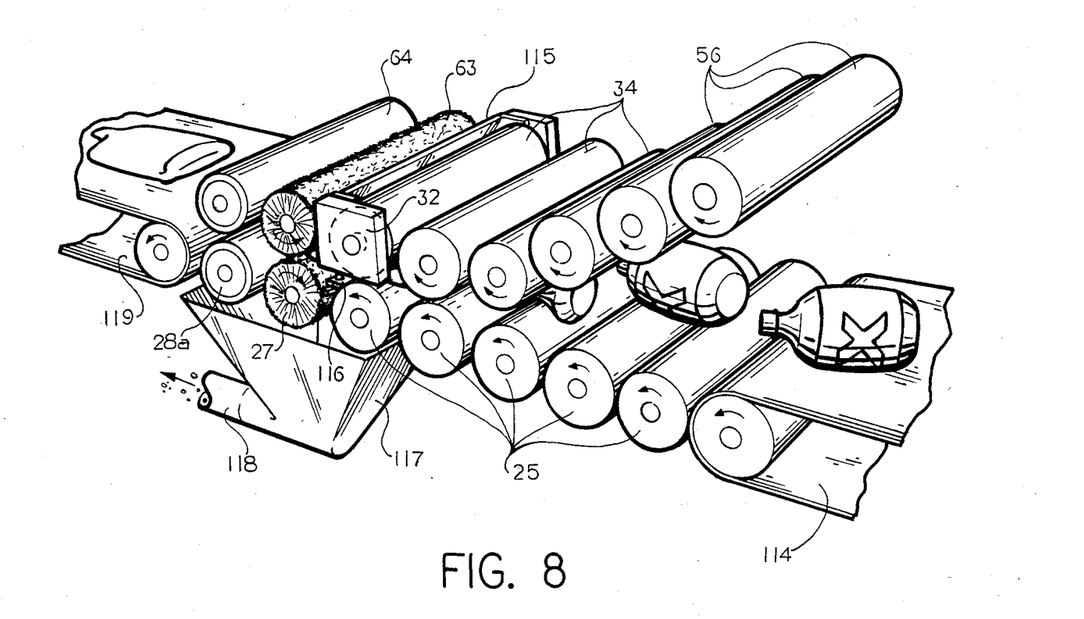
FIG. 8 is a schematic, perspective view of the delabeler of FIG. 1 with incoming and outfeed conveyors and showing bottles passing therethrough.

Turning now with particular reference to FIG. 8 and with reference to FIGS. 1 and 2, the drive system for driving all of the heated rolls and the nip rolls 28a and 64 will be described. A gear box 90, such as a Falk reduction gear drive with torque limiter, manufactured by the Falk Corporation of Milwaukee, Wis., is mounted on a base 91 which extends between the legs 11 and 12 and supports the gear box 90. Coupled to the gear box 90 is a drive motor 92. The gear box 90 has an output shaft 93 on which a drive sprocket 94 is fixed. A chain 95 extends around the sprocket 94 and also about a sprocket 96 which is carried by the shaft 24 of the roll 25 which is at the extreme right in FIGS. 1, 2 and 8 in the lower set of rolls. As previously explained, each of the rolls 25 is supported at its one end by a drive shaft 26 and these shafts 26 each carry one or more drive sprockets as well. A drive sprocket 97 carried by the shaft 26 will be driven at the same shaft speed as the shaft 24 which carries the sprocket 96. The sprocket 97 is drivingly coupled to a sprocket 98 which is mounted on the shaft 26 of the next roll 25 to the left, as shown in FIG. 8. This shaft 26, which carries the sprocket 98, also carries another sprocket 99. The remaining three rolls 25 in the lower level of rolls have a pair of sprockets fixed to their drive shafts and each of the rolls then is driven and in turn drives the next roll in the same fashion as described above with respect to the other rolls 25. The last roll 25 drives the nip roll 28a through a sprocket chain. This last drive roll 25, which is closest to the brush roll 27, also has a sprocket 100 connected to its other supporting shaft 24. The sprocket 100 through a chain drives a sprocket 101 mounted on a shaft 102. The shaft 102 is journaled in a pair of stationary bearing blocks 103 mounted to a vertical plate 104. Intermediate the bearing blocks 103 the shaft 102 carries a spur gear 105. The spur gear 105 meshes with another spur gear 106 which is mounted on a shaft 107. The shaft 107 is parallel to shaft 102 and is supported by a pair of spaced bearing blocks 108 which are also fixed to the vertical plate 104. The shaft 107 not only supports the spur gear 106, but also has a sprocket 109 fixed thereto. The sprocket 109, through a drive chain, drives a sprocket 110 which is coupled to the hollow shaft 33 of the upper roll 34 which is closest to the brush roll 63. The opposite end of the roll 34 carries a shaft 46 which carries a pair of sprockets 111 and 112 fixed thereto. The sprocket 111 is coupled through the series of sprockets and drive shafts for the other rolls 34 and 56, as illustrated in FIG. 8, and will drive all of these rolls. The sprocket 112, through a chain 113, will drive the upper, forward nip roll 64. Thus, it can be seen that the motor 92, through the gear box 90, will drive all of the heated rolls 25 in the lower frame of the apparatus and the rolls 34 in the upper stationary frame as well as the rolls 56 which are carried by the pivoted frame 45.

Additionally, the motor 92 drives the nip rolls 28a and 64. While the apparatus, as shown in FIG. 1, appears as a stand-alone unit, obviously, in order to perform its function of delabeling labels from plastic bottles, it is necessary that the apparatus of FIG. 1 have plastic bottles fed thereto, as well as removal of the label material and the flattened bottles from the machine.

Turning now to FIG. 8, there is shown in conjunction with the heated rolls 34, 56 and 25 an incoming conveyor 114 on whose surface the plastic containers are to be transported into the area between the upper and lower sets of heated rolls. As previously explained, the rolls are all being driven in the direction such that they will take a plastic bottle and move it from the right to the left, as viewed in FIGS. 1 and 8. As shown in FIG. 8, a bottle lying on the conveyor 114 is being transported into the area between the rolls 56 and the rolls 25. As the bottles on the moving conveyor come into contact with the moving rolls, they will become gripped by the rolls and will be flattened out as they progress from the right to the left. While being flattened out, it should be remembered that the rolls are heated and therefore will transmit that heat to the plastic bottles as they are being flattened. In the flattening and heating, the glues that are used to adhere the labels to the bottles will become softened. A typical glue that is used is a hot melt glue which has a softening point of about 150° F. Thus, with the rolls heated above this temperature by the circulation of the heating fluid therethrough as previously explained, the heat will be transmitted to and soften the glue as the bottles are being flattened and the labels will begin to slide and move relative to the underlying plastic container. When the flattened bottles approach the driven brush rolls 27 and 63, the pair of rolls 34 and 25 just in advance of the brush rolls will push the flattened containers into the nip between the two brush rolls. When the flattened container has been moved slightly farther against the counter-rotational direction of the brush rolls, it will be caught by the nip rolls 64 and 28a and will be pulled through the brushes with the brushes effectively removing the paper labels from the flattened plastic containers.

As might be expected, the label material with the softened glue may become adhered to the heated rolls 25 just in advance of the brush rolls and to prevent any buildup of stripped labels on either of the upper or lower rolls, a scraper 115 is provided to scrape any debris from the roll 34. The upper scraper 115 is mounted to the bearing blocks for the upper roll 34 and therefore will travel up and down as the upper roll is displaced by the movement of the flat bottles therebeneath. A second scraper 116 is positioned to the left of the lower roll 25 adjacent the brush roll 27 and effectively keeps the paper label material from accumulating on this lower roll. The label material that is scraped from the rolls and/or which is picked up by the brush rolls 27 and 63 will be collected in an open-topped, downwardly tapered, bin 117 positioned beneath the brush roll and extending both forward and rearward a distance sufficient to assure that it will collect the material falling from the area of the brush rolls. The bin 117 has an outlet pipe 118 connected to the bottom thereof. Within this pipe 118, or in the bottom of the bin itself, a blower is positioned which in effect will draw air downwardly toward the bottom of the bin 117 and exhaust the material out through the outlet pipe 118. In this manner, the paper material, or in some instances where label material may be a plastic which is not compatible with recycling of the plastic of the bottle, is separated from the flat container. The flattened containers are pushed and pulled rapidly through the brushes, but since the brushes are being driven separately, their surface velocity is much greater than the velocity at which the heated rolls and nip rolls are driven. After passing through the nip rolls, the flattened plastic container will be carried away from the apparatus of the delabeler by an outgoing conveyor 119, as shown in FIG. 8.

Figure 7:
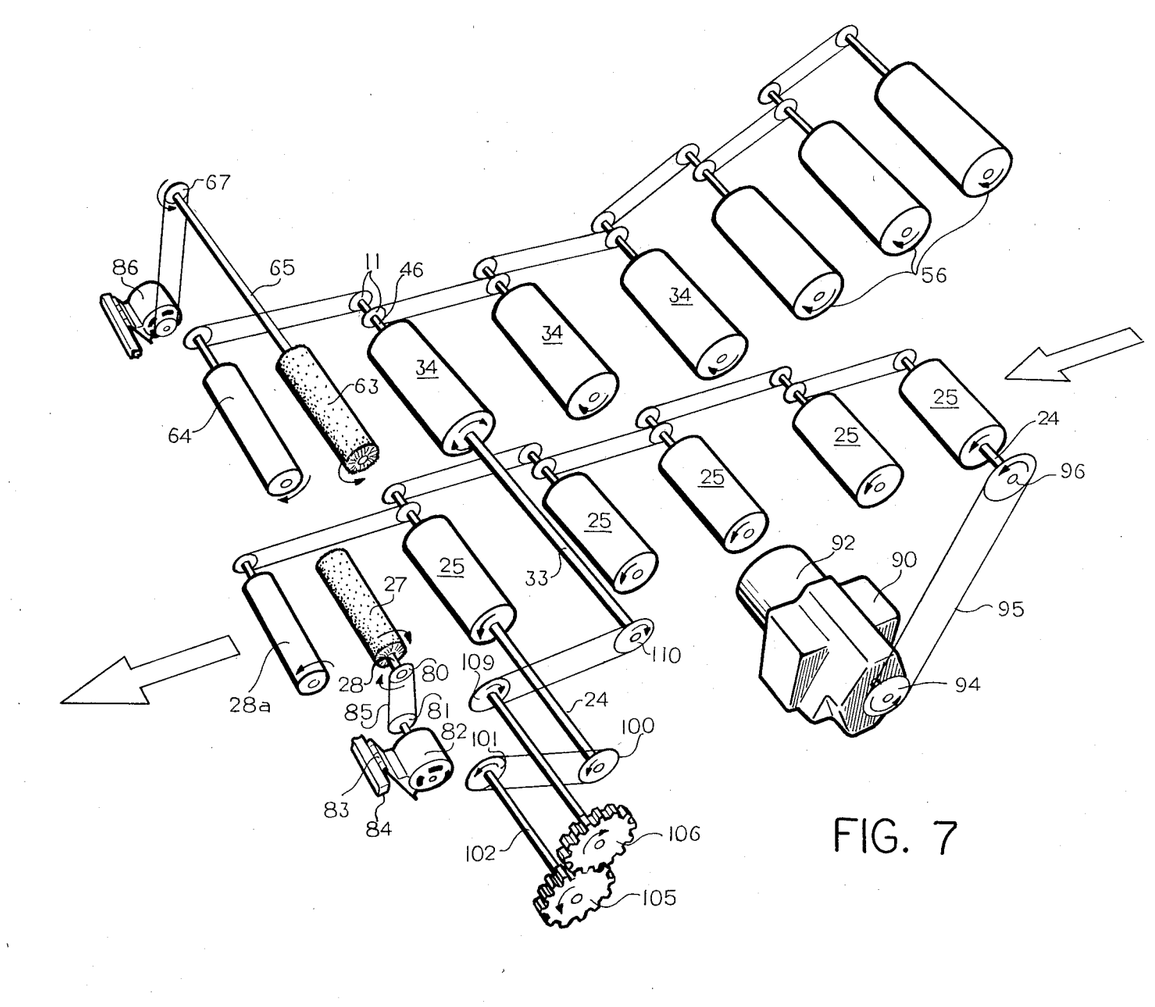
FIG. 7 is an exploded, perspective view of the roll of FIG. 1 and the drive system therefor.

With the configuration of the apparatus of the delabeler as described above, whether the bottles are sitting up on the incoming conveyor or whether they are lying down as depicted in FIG. 8 is immaterial, since the upper rolls 56 are driven and will effectively draw or push down any upright container that they contact and in effect prepare the container to be flattened between the successively positioned series of heated rolls. The labels will be heated, removed by the brush rolls, and the flattened bottles conveyed from the apparatus. The system of driving the rolls 25, 56 and 34 is specifically designed so that the drive sprockets at the right hand end of the apparatus, such as the sprocket 97, is larger in diameter than the next succeeding drive sprocket 98. In turn, sprocket 98 is slightly larger in diameter than the sprocket which drives the next drum to the left and it in turn is larger than the succeeding sprockets. The same is true with the relationship of the upper drive sprockets in that the drive sprocket for the most right hand roll 56, as viewed in FIGS. 4 and 7, is driven with the largest sprocket and the sprocket 111, which drives the roll 34, is the smallest in diameter. Each of the intervening sprockets is larger in a successive, step-wise fashion as explained with regard to the sprockets in the lower set of drive sprockets for the rolls 25. In this manner, not only are the plastic containers flattened, but they will be stretched because the peripheral velocity of the opposed sets of rolls are increasing as they move from the right toward the left where the brushes are positioned. Thus, not only are the rolls heating the labels, they are also effectively tearing the labels by reason of the greater surface velocity of succeeding pairs of rolls as the flat containers are moved through the delabeler. This is particularly important, since once the containers arrive at the brush rolls, it is essential that the glue be soft and that the integrity of the labels will have been disturbed, either turned or ruptured by the operation of the prior sets of heated rolls in advance of the arrival of the container at the high speed brush roll area. The initial rolls, which are encountered as the container enters the delabeler, will prepare the bottle for delabeling. The rolls are temperature controlled so as to heat the container. This heat softens the plastic while weakening the bonding strength of the temperature activated glue. The rolls are positioned so as to flatten the container, thereby exposing the entire label panel to the heated rolls. The rolls in the section just prior to the brush rolls are high pressure nip rolls. They grip the bottle while also stretching it. This action generates the necessary force to break the bond between the glued-on label and the plastic bottle surface. The next section contains the scrubbing brushes and the pull rolls to effectively remove any residual loose paper. The exhaust blower in the bin outlet 118 will create a negative pressure in the delabeling unit and serves to remove loose paper as it may accumulate.

In one specific example, each of the rolls 25, 34 and 56 were made four inches in diameter. The nip rolls 64 and 28 may be steel or rubber-surfaced pull rolls, while the rolls 34, 56 and 25 are steam, hot oil or water heated metal rolls. The brush rolls 63 and 27 were steel wire brush rolls. While the delabeler of the invention has particular utility as an inline system eliminating the need to separate contaminated regrind from clean regrind in a plastic bottle manufacturing and labeling operation, it can also be used to clean returned containers for reclaiming as well. Therefore, a closed loop system using the series of rolls to flatten the plastic container while heating the surface of the plastic and label to weaken the strength of the glue bond is provided. Also, by the mechanical manipulation, the apparatus stretches the plastic and creates a force which will break the paper away from the plastic so that it can easily be separated from the flattened plastic container.

Having described the best mode of carrying out the invention, it should be apparent that some modifications may be resorted to without departing from the spirit and scope of the following claims.

I claim:

1. Apparatus for removing extraneous material from plastic containers for recycling of the plastic, comprising an infeed conveyor, a first series of horizontal rolls in line with said conveyor, a second series of horizontal rolls positioned above said first series, means mounting said second series of rolls at progressively less vertical distance from said first series of rolls in a direction away from said infeed conveyor, means for driving said first series of rolls at progressively greater velocities the further the roll is from the infeed conveyor, means connected to said rolls for heating said rolls, a pair of vertically opposed wire brush rolls positioned adjacent the last heated rolls, means for driving said brush rolls at a much lesser peripheral velocity than said heated rolls and in an opposed direction to the movement of a container therebetween, and a pair of opposed, driven pull rolls positioned adjacent said brush rolls, for pulling flattened containers from the brush rolls.

2. The apparatus of claim 1 further including adjustable force applying means for biasing the heated rolls of said second series in the direction of said first series of rolls.

3. The apparatus of claim 2 wherein said biasing means applies a high force to the last two rolls in the second series relative to the first series.

4. The apparatus of claim 1 wherein said first series of rolls is five in number.

5. The apparatus of claim 1 wherein said second series of rolls is six in number.

6. The apparatus of claim 1 wherein said means for mounting said second set of rolls comprises an angularly adjustable frame supporting the ends of said rolls and means for raising the frame.

7. The apparatus of claim 1 wherein a plurality of said rolls of said first and second sets of rolls are heated to a temperature sufficient to soften the plastic of the containers passing therethrough.

8. The apparatus of claim 7 wherein said extraneous materials are labels adhesively attached to said containers and said heated rolls effectively melt the adhesive for easy removal from said flattened containers.

9. The apparatus of claim 1 further including a pair of vertically opposed wire brush rolls adapted to engage a flattened bottle exiting from the first and second series of rolls.

10. The apparatus of claim 9 further including a pair of horizontal nip rolls positioned in vertical alignment adjacent the exit from said brush rolls and drive means for rotating said nip rolls for pulling the bottles through the brushes.

* * * * *